P. ROUDEL.
TAILORS' DRAFTING APPARATUS.
No. 174,443. Patented March 7, 1876.
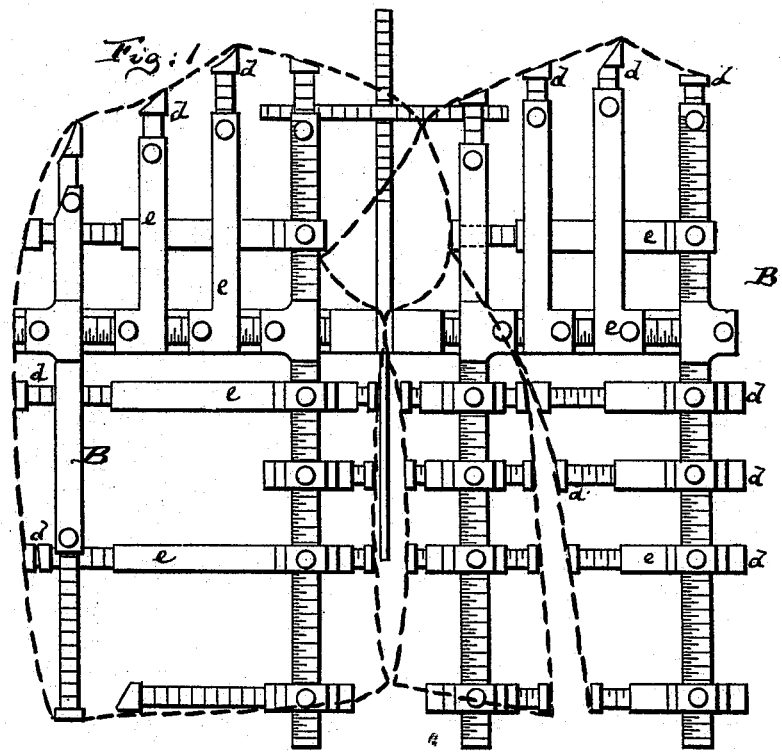
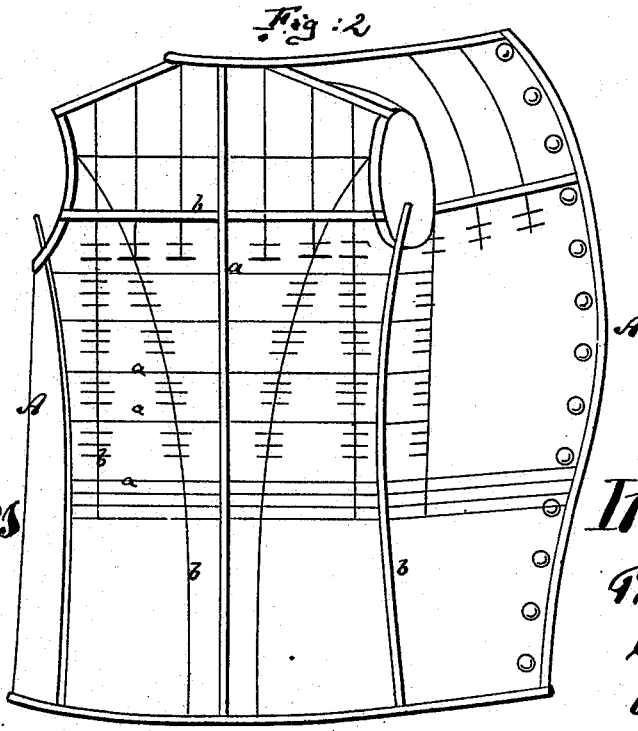
Witnesses
A. Moraga
O. Widmer
Inventor
Pierre Roudel
by his attorney
A. v. Briesen

UNITED STATES PATENT OFFICE.

PIERRE ROUDEL, OF PARIS, FRANCE.

IMPROVEMENT IN TAILORS' DRAFTING APPARATUS.

Specification forming part of Letters Patent No. 174,443, dated March 7, 1876; application filed October 11, 1875.

*To all whom it may concern:*

Be it known that I, PIERRE ROUDEL, of Paris, France, have invented an improved apparatus for measuring the human figure, and for setting out the patterns of garments, &c.; and I do hereby declare that the following is a full, clear, and exact description of the same, reference being had to the annexed drawing, making a part of the same.

This invention relates to a mechanical or geometrical apparatus for use in setting out patterns of garments, and also to an apparatus, termed a "conformator," for obtaining tailors' measurements of the human figure, the latter apparatus being also applicable for other purposes.

By means of the apparatus of this invention the utmost precision is insured, and a tailor is enabled to produce with absolute certitude perfectly-fitting garments, which do not require to be tried on and altered before being finally made up, as in the case of garments cut upon measurements taken in the ordinary manner. Moreover, the garments may be made according to all the different methods of cutting out, and in all the various styles and fashions, whether simple or complex, with the same precision of fit and with equal facility.

Another advantage is the facility afforded by the conformator or apparatus above mentioned for self-measurement at a distance from the tailor, so that by transmitting the measurements so taken of the different parts of the figure perfectly-fitting garments can be produced without trying on or alteration.

As before mentioned the invention comprises two apparatus, viz: first, a mechanical or geometrical apparatus, constructed of metal, for use in setting out the patterns; and, second, the apparatus termed a "conformator," made of india-rubber, and used for taking the measurement of the human figure.

In the drawing Figure.1 is a face view of the geometrical delineator, and Fig. 2 a side view of the improved conformator.

The conformator A is an elastic garment or partial garment, made of india-rubber or equivalent material, so that it will, when placed upon a person, snugly adapt itself to his or her figure. This conformator has lines or projecting ribs *a a* and *b b*, and other marks formed on it, of the like elastic material, so that said lines, ribs, or marks will expand and contract with the body of the comformator. The article, being on a person, bust, or other thing to be measured, enables the tailor or other person to ascertain the exact pattern necessary for a fitting garment, by measuring the length of the lines or ribs, and the distances between them and between the marks. Every peculiarity of outline will thus be detected and properly located with great exactness. For transferring the measurements found on the conformator I have devised the delineator or extension instrument B, (shown in Fig. 1,) which is made of a series of adjustable graduated slides, *d d*, *e e*, &c., whose position on the supporting-bar *f* and its branches correspond, substantially, to the position of the marks on the conformator A. The length found on any line or rib of the conformator is, therefore, conveniently set out on the graduated slides *d d* and *e e*, until the outlines indicated by their ends will correspond to the outline of the garments to be produced. I will, of course, use a conformator for the waist, another for trousers, another for the frock, &c., and for every conformator a corresponding delineator. The invention is applicable to other than tailors' purposes. Thus it may be used by sculptors for producing statuary, and for other analogous purposes.

I am aware of the Patent No. 56,892, granted to S. O. Brigham, August 7, 1866, for an improved body-conformer; but in this patent the elastic conformator is provided with rows of spurs for puncturing a pattern of paper placed thereon, and it can, therefore, not be used in connection with a tape-measure, as the spurs would cut and injure the tape while used on the conformator for taking measurements. But the smooth projecting ribs invented by me do not interfere with the proper use of the tape-measure, and yet allow the application of translucent paper patterns.

I claim as my invention—

1. The elastic conformator A, herein described, provided with smooth projecting ribs, lines, or marks of like material, across which the tape-measure is placed in the process of measuring, substantially as specified.

2. The combination of the elastic conformator A, herein described, with the extensible delineator B, having the adjustable graduated slides $d\ d\ e\ e$ and the supporting-bar $f$, the position of the slides on the supporting-bar corresponding, substantially, with the position of the ribs or marks on the conformator A, substantially as and for the purpose herein shown and described.

PIERRE ROUDEL.

Witnesses:
EMILE DUHAN,
ALEXANDRE SILBERMAN.